United States Patent [19]

Nishiguchi et al.

[11] Patent Number: 4,544,858
[45] Date of Patent: Oct. 1, 1985

[54] PIEZOELECTRIC MECHANISM FOR CONVERTING WEIGHT INTO FREQUENCY

[75] Inventors: Yuzuru Nishiguchi; Shigeru Uchiyama; Masaaki Kobayashi, all of Tokyo, Japan

[73] Assignee: Shinko Denshi Company Limited, Tokyo, Japan

[21] Appl. No.: 616,050

[22] Filed: Jun. 1, 1984

[30] Foreign Application Priority Data

Jun. 30, 1983 [JP] Japan .................. 58-117114

[51] Int. Cl.[4] .................................. H01L 41/08
[52] U.S. Cl. .................................. 310/321; 310/323; 310/338; 177/210 FP; 177/DIG. 11
[58] Field of Search ............... 310/328, 323, 338, 15, 310/20, 21, 25, 26, 321; 177/152, 210 R, 210 FP, DIG. 11; 73/296, 433, 514 AV

[56] References Cited

U.S. PATENT DOCUMENTS

| | | | |
|---|---|---|---|
| 3,470,400 | 9/1969 | Weisbord | 310/323 X |
| 4,215,570 | 8/1980 | Nisse | 310/338 X |
| 4,406,966 | 9/1983 | Paros | 310/338 X |
| 4,435,666 | 3/1984 | Fukui et al. | 310/323 X |

*Primary Examiner*—Mark O. Budd
*Attorney, Agent, or Firm*—Lawrence I. Field

[57] ABSTRACT

A mechanism for converting a weight into a frequency by means of a tuning fork vibrator having a pair of elongated plate-like vibrating strips extending in parallel with each other, a lever unit with a power pivot, fulcrum pivot and a load pivot, and a base portion, both ends of the tuning fork vibrator being coupled with the power pivot of the lever unit and the base portion, respectively by means of thin plate-like members. The weight to be converted is applied to the load pivot of the lever unit and is transferred to the tuning fork vibrator by means of the lever unit. All the parts of the mechanism are formed integrally from a single plate.

8 Claims, 5 Drawing Figures

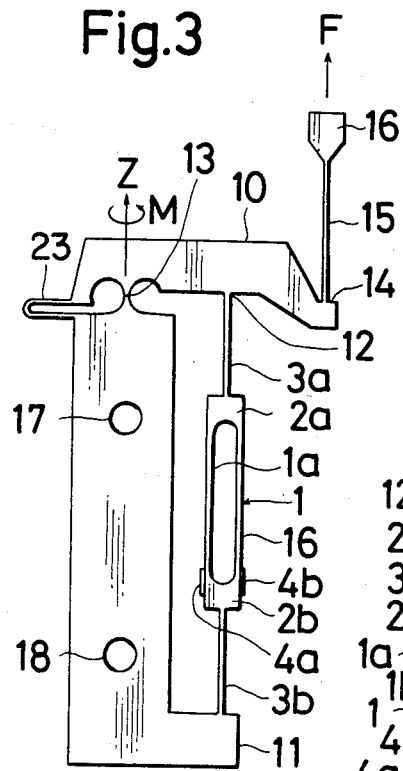
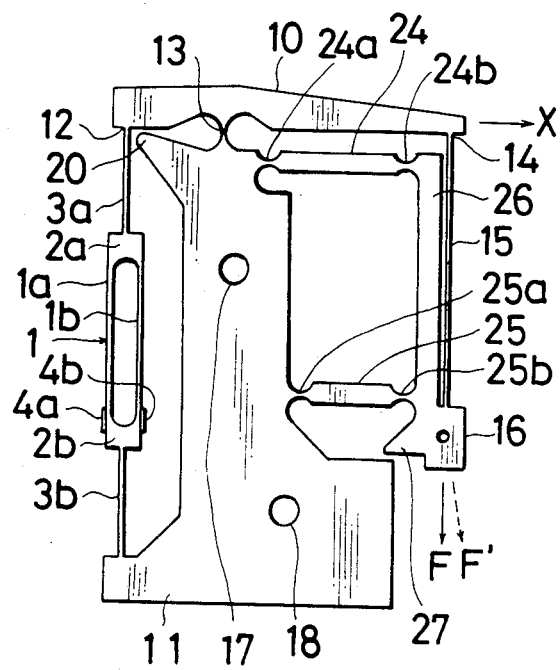
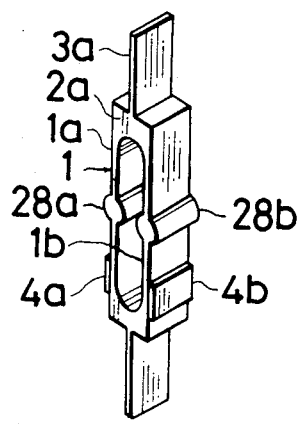

PIEZOELECTRIC MECHANISM FOR CONVERTING WEIGHT INTO FREQUENCY

BACKGROUND OF THE INVENTION

The present invention relates to a mechanism for converting a weight into a frequency comprising a tuning fork vibrator formed integrally therewith.

Heretofore, there has been proposed to measure a weight by utilizing a phenomenon that a natural frequency of a tuning fork is varied in accordance with a tension or compression force applied to the tuning fork as disclosed in Japanese Patent Application Laid-open Publications Nos. 133,390/79 and 51,329/80. In the weight measuring apparatus using the tuning fork, if the weight is correctly applied to the fork in its axial direction, there can be obtained an accurate measuring result. However, if a twisting or bending force is applied to the vibrating fork or if an undesired force perpendicular to the axial direction of the fork is applied thereto, there might be produced various measuring errors which give a hindrance for practical use. Moreover, when the vibrating fork is secured to a measuring apparatus, for instance a weighing apparatus, the fork is subjected to undesired internal stress. Further the internal stress is different from respective securing operations and therefore, the characteristics of the tuning forks might be varied for respective forks. In some cases, there might be produced hysteresis and creeps and the resolution might be lowered. It should be further noted that since the various portions are made of materials having different thermal expansion coefficients, error might be introduced due to temperature variation.

SUMMARY OF THE INVENTION

The present invention has for its object to provide a weight converting mechanism using a tuning fork vibrator, which can overcome all the above mentioned drawbacks, can be fabricated by a smaller number of manufacturing steps, has an excellent vibrating characteristic and has a high accuracy with a simple construction. According to the invention, a mechanism for converting a weight into a frequency comprises a vibrating element formed by a tuning fork vibrator which includes a pair of elongated plate-like vibrating strips extending in parallel with a center axis symmetrically therewith and a pair of bridging protions for coupling the vibrating strips with each other at their both ends, a natural resonance frequency of the tuning fork being changed in response to the weight applied thereto in the axial direction, characterized in that one side of the vibrating element viewed in the axial direction is connected via a thin plate-like portion to a power pivot of a lever unit supported at a fulcrum pivot, the other side of the vibrating element is coupled via a thin plate-like portion with a base portion, a load pivot of the lever unit is connected by means of a thin plate-like portion to a weight receiving portion, the weight to be converted and received by the weight receiving portion is transferred to the vibrating element by means of the lever unit, and all the parts are formed integrally from a single body.

BRIEF DESCRIPTION OF THE DRAWINGS

FIG. 3 is a front view depicting a third embodiment of the weight converting mechanism according to the invention;

FIG. 4 is a front view showing a fourth embodiment of the weight converting mechanism according to the invention; and FIG. 5 is a perspective view illustrating another embodiment of a tuning fork vibrator according to the invention.

DESCRIPTION OF THE PREFERRED EMBODIMENTS

Figure 1:
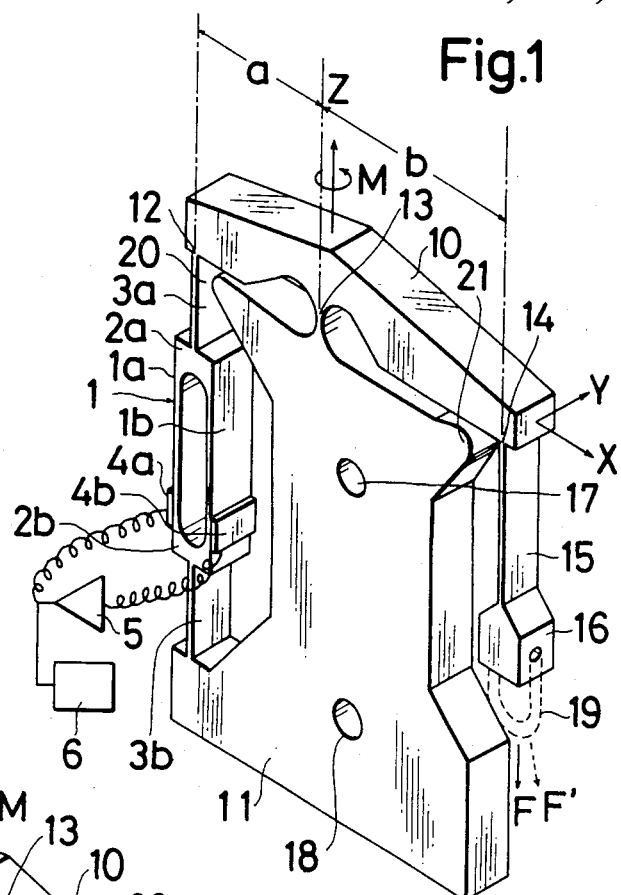
FIG. 1 is a perspective view illustrating a first embodiment of the weight converting mechanism according to the present invention.

FIG. 1 illustrates a principal construction of the weight converting mechanism according to the invention. A tuning fork vibrator 1 comprises a pair of elongated vibrating strips 1a and 1b, a pair of U-shaped bridging portions 2a and 2b for connecting the vibrating strips 1a and 1b to each other at their respective ends and a pair of thin plate-like portions 3a and 3b for supporting the vibrating strips at the both ends thereof viewed in an axial direction. It should be noted that in known converting mechanisms, only the tuning fork vibrator is formed as a single body independently. In order to generate a continuous vibration, on respective sides of the bridging portion 2b are applied first and second piezo-electric elements 4a and 4b, respectively by means of bonding material or evaporating deposition. These elements are connected respectively to an input and an output of an amplifier 5 provided outside the vibrator 1. Then the first piezo-electric element 4a serves to excite the vibrator 1 and the second piezoelectric element 4b operates as a pick-up. By suitably selecting a gain and frequency characteristics of the amplifier 5, the elongated vibrating strips 1a and 1b vibrate symmetrically at a natural frequency corresponding to the weight, i.e. force applied to the tuning fork vibrator 1. Thus, by detecting the frequency by a frequency counter 6, it is possible to display the applied weight.

According to the present invention, the tuning fork vibrator 1 is not formed independently as a single body, but is formed integrally with a lever unit 10 and a base portion 11 from a single body. One end of the tuning fork vibrator 1 is connected to one end of the lever unit 10 by means of the thin plate-like portion 3a at a power pivot 12 of the lever unit 10. The other end of the tuning fork vibrator 1 is coupled with the base portion 11 by means of the thin plate-like portion 3b. The other end of the lever unit 10 is connected via a thin plate-like tension strip 15 to a weight receiving portion 16 at a load pivot 14 of the lever unit 10 which is supported by the base portion 11 at a fulcrum pivot 13. The weight F applied to the weight receiving portion 16 is transferred to the tuning fork vibrator 1 by means of the lever unit 10.

The lever unit 10 may have a given desired lever ratio a:b. When the weight to be converted is smaller than 5 kgf, it is practical to set that a is smaller than b. In the base portion 11 are formed holes 17 and 18 for securing the converting mechanism to a housing of a weighing apparatus. The weight receiving portion 16 may be provided with a hook 19 shown by a broken line and the weight to be converted may be applied to the hook for example. Near the power pivot 12 and load pivot 14 are formed projections 20 and 21, respectively integrally with the base portion 11 so that the lever unit 10 is spaced from the base portion 11 by small distances.

In the present embodiment, when the force F due to the weight to be measured is applied to the weight receiving portion 16, the force is applied to the tuning fork vibrator 1 by means of the lever unit 10 having the lever ratio a:b and the multiplied force (b/a)F is applied to the vibrator 1. Then by detecting the vibrating frequency of the vibrator 1 with the aid of the frequency counter 6, the weight can be displayed. In this case, even if the force F applied to the weight receiving portion 16 is not in parallel with a center axis of the vibrator 1 and the thin plate-like strip 15 or any disturbing force except measuring force F is applied to any parts of the converting mechanism, the tuning fork vibrator 1 is not damaged at all and the vibrating condition is not affected at all.

For instance, when a force F' having an undesired component in an X direction parallel to a plane of the body is applied to the weight receiving portion 16, this component in the X direction is also applied to the lever unit 10 and a lateral force is applied to the fulcrum pivot 13, but since the lever unit 10 is hardly deformed in its longitudinal direction, the undesired component does not influence the tuning fork vibrator 1 and thus, the vibrating condition of the fork vibrator 1 is not varied. Further, if the force F contains a twisting component, this component is absorbed by the thin plate-like strip 15 and thus, does not affect the tuning fork vibrator 1.

If the force F includes a component in an Y direction perpendicular to the body, there is produced a rotational force M about a Z axis passing through the fulcrum pivot 13. Then, the rotational force is suppressed by the fulcrum pivot 13 and the influence of the rotational force to the vibrator 1 is reduced materially in dependence upon the dimensions of the fulcrum pivot 13 in the X and Y directions. It should be noted that the rotational force may be further reduced by suitably connecting the hook 19 to the weight receiving portion 16.

Next an operation will be explained in case of applying an excessive force beyond a measurable range. In such a case, the lever unit 10 is rotated about the fulcrum pivot 13 in the clockwise direction and the lever unit 10 is urged against the projection 21 near the load pivot 14 and thus, the rotation of the lever unit 10 is limited. In this manner, the tuning fork vibrator 1 can be effectively protected from the excessive large force. When an excessively large compressive force is applied to the weight receiving portion 16, the thin plate-like strip 15 is bent and thus the tuning fork vibrator 1 is protected from the excessive compressive force. Furthermore, even if the large compressive force is applied directly to the lever unit 10, the rotation of the lever unit 10 is limited by the engagement of the lever unit with the projection 20 near the power pivot 12. In this manner, the tuning fork vibrator 1 can be effectively protected from the excessively large tensile and compressive forces.

The above explained weight converting mechanism may be formed by various methods and in practice, it is recommended to form the mechanism from a single plate by means of a wire cut electric discharge machine. In this case, the mechanism except for the piezo-electric elements 4a and 4b can be formed from the single material by a single process and therefore, the manufacturing step can be made very simple. Further, there is not introduced any different characteristics between respective manufactured units and internal stress could not be introduced because there is no assembling work during the manufacturing. Therefore, hysteresis and creep could not be produced at all and uniform characteristics and high resolution could be attained. In practice, the converting mechanism may be made of a plate made of alloy having constant coefficient of elasticity and after cutting the whole body it is annealed, so that any internal stess due to the machining can be completely removed. Further, since the whole body of the converting mechanism is formed by the single material, coefficients of thermal expansion of the various portions are equal to each other and thus, even under the temperature variation, the lever ratio b/a is maintained constant and a measuring error due to the temperature variation is almost never produced.

Figure 2:
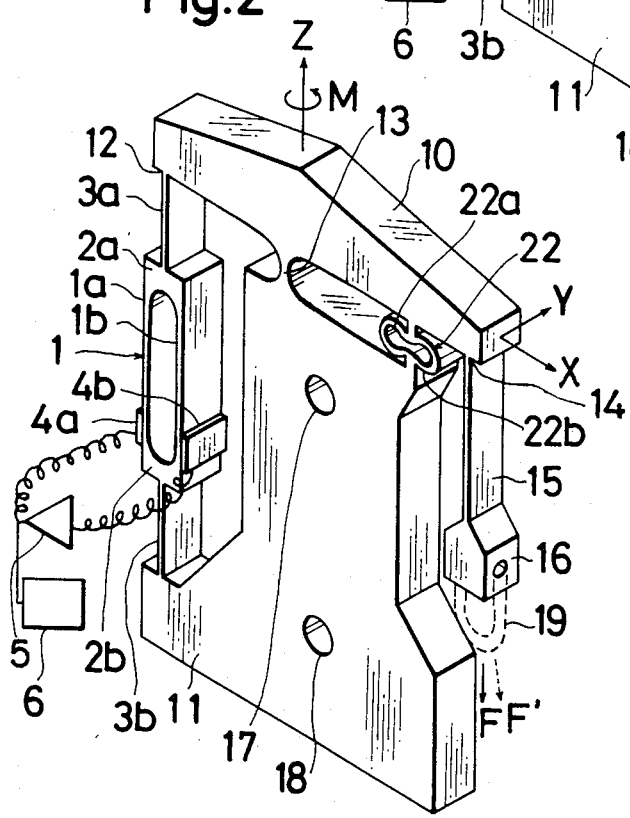
FIG. 2 is a perspective view showing a second embodiment of the weight converting mechanism according to the invention.

FIG. 2 shows a second embodiment of the weight converting mechanism according to the invention. Difference of the present embodiment from the first embodiment illustrated in FIG. 1 is that the lever unit 10 and the base portion 11 are coupled with each other not only at the fulcrum pivot 13 but also near the load pivot 14 by means of a thin ring-shaped spring 22 having a small spring coefficient. It should be noted that the spring 22 is also formed integrally with the lever unit 10 and base portion 11.

When a tensile force of, for example 5 kgf is applied to the tuning fork vibrator 1, it is extended by a very small distance of about 0.01 mm and thus its spring coefficient has a quite large value such as 500 kgf/mm. It is easy to set the spring coefficient of the spring 22 to a small value such as 5 kgf/mm. Under such a condition, only about one percentage of the load F to be measured is absorbed by the spring 22 and the remaining force is effectively transferred to the tuning fork vibrator 1. Therefore, the provision of the spring 22 does not affect the measurement at all.

In the present embodiment, when the force F is not in parallel with the axis of the fork vibrator 1 or contains a component in the Y direction which generates a moment M about the Z axis, the shearing force in the Y direction is applied to the spring 22. However, since the spring 22 has a very large resistance against the force in the Y direction, the lever unit 10 is not twisted about the Z axis and thus, the moment M is not transferred to the fork vibrator 1. In this manner, in the embodiment shown in FIG. 2, only the force parallel with the axis of the tuning fork vibrator 1 is applied thereto and other undesired disturbing forces are all removed, and thus, the extremely high precision of measurement can be obtained. Furthermore, when a distance between an upper half 22a and a lower half 22b of the spring 22 is set to a small value, in case of applying an excessive large force, these halves 22a and 22b are first brought into contact with each other and the tuning fork vibrator 1 can be effectively protected from damage.

FIG. 3 illustrates a third embodiment of the weight converting mechanism according to the invention. In the present embodiment, the fulcrum pivot 13 is not provided between the load pivot 14 and power pivot 12, but is arranged at a position opposite to the load pivot 14 with respect to the power pivot 12. Further, the weight receiving portion 16 is provided above the load pivot 14 and is connected to the lever unit 10 by means of the thin plate-like strip 15. Thus, the force F due to the weight to be measured should be applied upwards as shown by an arrow. Moreover, between the lever unit 10 and base portion 11 is integrally formed a spring 23 which is similar to the spring 22 in the embodiment of FIG. 2. The spring 23 has a U-shape, but may be formed in any desired shape such as an S-shape as long as it has a small spring coefficient and a high resistance against the shearing force.

FIG. 4 depicts a fourth embodiment of the weight converting mechanism according to the invention which has a larger resistance against the undsired force than that of the first embodiment shown in FIG. 1. There is provided a parallel link mechanism including a first link 24 having flexures 24a and 24b at both ends and a second link 25 also having flexures 25a and 25b at both ends, these links extending in parallel with the lever unit 10. The links 24 and 25 are connected, on one hand, to the base portion 11 via the flexures 24a and 25a and, on the other hand, to a connecting rod 26 a lower end of which is coupled with the weight receiving portion 16.

In the present embodiment, since the weight receiving portion 16 and connecting rod 26 form a solid body, when the displacement is small, they could not move in directions except for a rectangular direction of the links 24 and 25, i.e in the direction parallel with the axis of the fork vibrator 1. Therefore, even if a force F' including a component in the X axis is applied to the weight receiving portion 16, the undesired component in the X axis is absorbed by the links 24 and 25 and does not influence the thin plate-like strip 15 and tuning fork vibrator 1. Similarly, even if a twisting moment is applied to the weight receiving portion 16, this moment is absorbed by the link mechanism comprising the links 24 and 25 and connecting rod 26, so that the tuning fork vibrator 1 is not affected. Further, in the present embodiment, a projection 27 is formed integrally with the weight receiving portion 16 and is opposed to the base portion 11 by a small distance. Then, the projection 27 serves as a stopper when an excessively large force is applied to the weight receiving portion 16.

FIG. 5 is a perspective view showing another embodiment of the tuning fork vibrator according to the present invention. In the present embodiment, portions similar to those shown in FIG. 1 are denoted by the same reference numerals used in FIG. 1. In this embodiment, at middle points of a pair of vibrating strips 1a and 1b there are integrally formed cylindrical balancing weights 28a and 28b, respectively. It is important that the balancing weights 28a and 28b should have a small dimension in the axial direction of the tuning fork 1 and therefore, the balancing weights may have any desired shape other than the cylindrical shape. When the balancing weights 28a and 28b are provided at the middle points of the vibrating strips 1a and 1b, although the natural frequency of the tuning fork 1 is lowered, any undesired influence is not applied to the tuning fork 1, because the middle point corresponds to a loop of a vibration. If the natural frequencies of the vibrating strips 1a and 1b respectively are turned out to be different from each other, one of the balancing weights 28a or 28b formed in the strips having a lower vibrating frequency is cut out by such an amount that its vibrating frequency is made identical with the higher vibrating frequency. Further, if the vibrating modes of the strips 1a and 1b are not equal to each other, they may be made identical with each other by cutting the one or both balancing weights 28a and 28b. In this manner the vibrating characteristics of the vibrating strips 1a and 1b can be made equal to each other in a very precise manner and thus, accurately symmetrical vibrations having no phase difference can be obtained. This results in that Q value is made high and the vibrating energy is not leaked out of the tuning fork 1. Moreover, the influence of the external vibration can be avoided and only the force due to the weight to be measured can be faithfully transferred to the tuning fork 1. Therefore, the vibrating frequency of the tuning fork 1 is determined solely by the applied weight so that the weight can be measured in a very accurate manner.

As explained above in detail, in the weight converting mechanism according to the present invention, the tuning fork vibrator is formed integrally with the base portion and lever unit and any undesired disturbing force can be removed, so that the excellent converting accuracy can be obtained. Moreover, since the whole parts are formed integrally, the manufacturing process can be made very simple, because it does not require any assembling work.

What is claimed is:

1. A mechanism for converting a weight into a frequency comprising:

a tuning fork vibrator including a pair of elongated plate-like vibrating strips extending in parallel with each other and a pair of bridging portions for coupling the vibrating strips with each other at their both ends, a natural resonance frequency of the tuning fork vibrator being changed in response to the weight applied there to in an axial direction of the tuning fork vibrator;

a lever unit having a power pivot, a load pivot and a fulcrum pivot;

a base portion having major surfaces extending in the axial direction of the tuning fork vibrator and connected to the fulcrum pivot of the lever unit;

a first plate-like portion for coupling one of the bridging portions with the power pivot of the lever unit;

a second plate-like portion for coupling the other bridging portion with the base portion; and a third plate-like portion for coupling the load pivot with a weight receiving portion to which the weight to be converted is applied; wherein all of said tuning fork vibrator, lever unit, base portion, first, second and third thin plate-like portions are formed integrally from a single plate in such a manner that the elongated plate-like vibrating strips extend perpendicularly to a major surface of said plate.

2. A mechanism according to claim 1, wherein said lever unit is opposed to an end portion of the base portion near the load pivot by a small distance such that when an excessive weight is applied to the load pivot, the movement of the lever unit is limited by the end portion.

3. A mechanism according to claim 1, wherein said lever unit is opposed to an end portion of the base portion near the power pivot by a small distance such that when an excessive compression force is applied to the lever unit, the movement of the lever unit is limited by the end portion.

4. A mechanism according to claim 1, wherein said lever unit and base portion are coupled with each other near the load pivot by means of a flat compression spring having a small spring coefficient and formed integrally therewith.

5. A mechanism according to claim 1, wherein there are further provided a pair of parallel links each having flexures at both ends, one side of the links being connected to the base portion and the other side being connected to a connecting rod coupled with the weight receiving portion and the movement of the weight receiving portion is limited only in parallel with the axial direction of the tuning fork vibrator.

6. A mechanism according to claim 1, wherein said power pivot is located between the fulcrum pivot and load pivot, and said weight receiving portion is arranged above the load pivot.

7. A mechanism according to claim 6, wherein an end of the lever unit opposite to the power pivot with respect to the fulcrum pivot is coupled with the base portion by means of a flat spring formed integrally therewith.

8. A mechanism according to claim 1, further comprising balance weights formed integrally with the respective vibrating strips at their middle points.

* * * * *